(12) United States Patent
Coughenour et al.

(10) Patent No.: US 8,973,954 B2
(45) Date of Patent: Mar. 10, 2015

(54) DUAL PURPOSE DIMPLE FOR HVAC CIRCULAR DUCTWORK

(71) Applicants: Alvin Coughenour, Elizabeth, PA (US); Vincent L. Bloom, Beallsville, PA (US); Duane Fetko, Masontown, PA (US)

(72) Inventors: Alvin Coughenour, Elizabeth, PA (US); Vincent L. Bloom, Beallsville, PA (US); Duane Fetko, Masontown, PA (US)

(73) Assignee: Ductmate Industries, Inc., East Monongahela, PA (US)

( * ) Notice: Subject to any disclaimer, the term of this patent is extended or adjusted under 35 U.S.C. 154(b) by 0 days.

(21) Appl. No.: 13/855,223

(22) Filed: Apr. 2, 2013

(65) Prior Publication Data

US 2013/0221667 A1    Aug. 29, 2013

Related U.S. Application Data

(60) Division of application No. 12/571,510, filed on Oct. 1, 2009, now Pat. No. 8,429,803, which is a continuation-in-part of application No. 12/133,482, filed on Jun. 5, 2008, now Pat. No. 7,992,904.

(60) Provisional application No. 60/942,412, filed on Jun. 6, 2007.

(51) Int. Cl.
| | |
|---|---|
| *F16L 9/02* | (2006.01) |
| *F16L 25/00* | (2006.01) |
| *F24F 13/02* | (2006.01) |
| *F16L 21/08* | (2006.01) |

(52) U.S. Cl.
CPC .............. *F16L 25/00* (2013.01); *F24F 13/0209* (2013.01); *F16L 21/08* (2013.01)
USPC ............................ 285/424; 138/164; 138/166

(58) Field of Classification Search
USPC .................. 285/424; 138/160, 166, 156, 159; 72/82, 83, 84, 86
See application file for complete search history.

(56) References Cited

U.S. PATENT DOCUMENTS

| | | |
|---|---|---|
| 467,999 A | 2/1892 | Southard |
| 701,468 A | 6/1902 | Clausing |
| 1,935,690 A | 11/1933 | Zack |
| 2,038,389 A | 4/1936 | Siebenlist |
| 2,147,775 A | 2/1939 | Miller et al. |
| 2,225,556 A | 12/1940 | Delaney |
| 2,866,481 A | 12/1958 | Bratsch |
| 3,146,950 A | 9/1964 | Lancaster |
| 3,246,918 A | 4/1966 | Burghart |
| 3,369,568 A | 2/1968 | Davis et al. |
| 4,018,461 A | 4/1977 | Bram |
| 4,040,651 A | 8/1977 | LaBranche |
| 4,099,747 A | 7/1978 | Meserole |
| 4,218,079 A | 8/1980 | Arnoldt |
| 4,820,569 A | 4/1989 | Hinden |

(Continued)

FOREIGN PATENT DOCUMENTS

DE       200 10 253 U1    8/2000

OTHER PUBLICATIONS

Q-41-20 Robofoam Mastic Sealant, Q'SO Product Data, Dec. 1997, Q'SO Incorporated, Saginaw.

(Continued)

*Primary Examiner* — David E Bochna
(74) *Attorney, Agent, or Firm* — Beck & Thomas, P.C.

(57) ABSTRACT

Sealing HVAC ductwork along its joints to reduce air leakage is achieved by the combination of a gasket and mechanical locking mechanisms.

4 Claims, 10 Drawing Sheets

(56) References Cited

U.S. PATENT DOCUMENTS

| | | | |
|---|---|---|---|
| 4,865,890 | A | 9/1989 | Erlichman |
| 4,874,191 | A | 10/1989 | Green |
| 4,941,693 | A | 7/1990 | Spaude et al. |
| 5,195,789 | A | 3/1993 | Walsh et al. |
| 5,346,264 | A | 9/1994 | Law et al. |
| 5,393,106 | A | 2/1995 | Schroeder |
| 5,505,230 | A | 4/1996 | Bartholomew |
| 5,662,360 | A | 9/1997 | Guzowski |
| 6,026,803 | A | 2/2000 | Wawrla |
| 6,279,967 | B1 | 8/2001 | Proctor et al. |
| 6,325,389 | B1 | 12/2001 | Sharify |
| 6,739,632 | B1 | 5/2004 | Thomas et al. |
| 6,866,308 | B2 | 3/2005 | Issagholian-Havai |
| 7,125,054 | B2 | 10/2006 | Jones |
| 2001/0026048 | A1 | 10/2001 | Proctor et al. |
| 2003/0108381 | A1 | 6/2003 | Walsh et al. |
| 2004/0218975 | A1 | 11/2004 | Walsh et al. |

OTHER PUBLICATIONS

The Modern Way to Seal Ductwork, Autosealer, Ductmate Industries, Inc., Mar. 6, 1986, pp. 1-6, United States of America.

T1 The New Standard for Round Air Ducts, SNIPS magazine, Apr. 2006, BNP Media, Troy, MI.

James Gerard, Declaration of James Gerard 37 CFR 1.132, May 21, 2007, pp. 1-2, Pittsburgh.

David Bochna, Non-Final Office Action for U.S. Appl. No. 12/133,482, May 24, 2010.

David Bochna, Final Office Action for U.S. Appl. No. 12/133,482, Nov. 18, 2010.

Mark Smith, Proposal for Green Building Products Innovation Grant, Sep. 2007.

Hot-Melt Gasket Seal specification sheet, Nov. 2006.

David Bochna, Non-Final Office Action for U.S. Appl. No. 12/133,482, Mar. 2, 2011.

Jason Premnath, Examiner's first report on Australian Patent Application No. 2009200281, Aug. 3, 2010.

Chau Tran, Examiner's Report for Canadian Patent Application No. 2,634,434, Jun. 3, 2011.

William S. Byrne, Examiner's Report for Canadian Patent Application No. 2,634,434, Apr. 6, 2010.

Jason Premnath, Examiner's report No. 2 on Australian Patent Application No. 2009200281, Sep. 29, 2011.

Heating & Cooling Products, Commercial Sealed Fittings Advertisement, Undated.

Spiramir Corp., Self-Sealing Spiral Duct System, Undated.

DUAL PURPOSE DIMPLE FOR HVAC CIRCULAR DUCTWORK

CROSS REFERENCE TO RELATED APPLICATION

This Application is a Divisional of application Ser. No. 12/571,510, filed Oct. 1, 2009, now U.S. Pat. No. 8,429,803, issued Apr. 30, 2013, which is a Continuation-in-Part Application of Nonprovisional application Ser. No. 12/133,482, filed Jun. 5, 2008, now U.S. Pat. No. 7,992,904, issued Aug. 9, 2011, which claims the benefit of Provisional Application Ser. No. 60/942,412, filed Jun. 6, 2007. This Application incorporates by reference Continuation-in-Part application Ser. No. 12/571,510, filed Oct. 1, 2009, now U.S. Pat. No. 8,429,803, issued Apr. 30, 2013, Nonprovisional Application Ser. No. 12/133,482, filed Jun. 5, 2008, now U.S. Pat. No. 7,992,904, issued Aug. 9, 2011, and Provisional Application Ser. No. 60/942,412, filed Jun. 6, 2007.

FEDERALLY SPONSORED RESEARCH OR DEVELOPMENT

Not applicable.

BACKGROUND OF THE INVENTION

1. Field of the Invention

This invention generally relates to a connection for HVAC ductwork. This invention specifically relates to a sealing mechanism for HVAC ductwork that reduces air leakage in joints.

2. Description of the Related Art

Traditional ductwork has air leakage at the joints. There has been a need to add a gasket material to the joints so that when the ductwork is connected little leakage occurs. However to be able to add a gasketing material during the manufacturing process the gasketing material would have to have the following properties:

1) Good adhesion to sheet metal;
2) Minimal surface tack; and
3) Short curing time.

There are numerous materials that have two out of the three qualities listed above but it is very difficult to find one having all three. Therefore, adding a gasketing material to the manufacturing process has been impractical. Typically in ductwork manufacturing it would take three seconds to form the longitudinal seam and then roll the sheet metal duct for shipping. As an example of how traditional gasketing materials would make the manufacturing process difficult one could look at adding a sealant that does not set up quickly. The sealant would have good adhesion to galvanized steel and little surface tack but does not set up quickly. It could take two to three hours or two to three days for the gasketing material to set up or cure. This length of time is not practical as either one would have to wait for each individual sheet to cure or you would have to have some type of stacking systems where the sheets are not touching each other. This would make volume manufacturing in a timely fashion impossible. Additionally, if the material sets up quickly but has too much surface tack it will cause problems in the shipping when the ducts are nested together.

U.S. Pat. No. 6,325,389 entitled "Self Sealing Fluid Duct/Fitting Connector" describes the problems in the prior art with Conventional HVAC systems. It describes the air leakage at the joints with traditional ductwork. The solution in U.S. Pat. No. 6,325,389 is a special connector for the ductwork with a sealant.

There is a need for sealing the connections between ductwork without having a special fitting that is incorporated in the connections manufactured into the ductwork.

SUMMARY OF THE INVENTION

This invention provides for a method of connecting two pieces of HVAC circular ductwork during installation of the HVAC ductwork including providing a plurality of circular ductwork. The circular ductwork can have a female end; a male end for connecting with a corresponding female end on another piece of circular ductwork so that two pieces of ductwork can be connected; a push-lock female transverse positioning lock on the female end; and a push-lock male transverse positioning lock on the male end capable of engaging with a corresponding female transverse positioning lock on another piece of circular ductwork. The method can include inserting the male end on a first piece of the provided circular ductwork into a corresponding female end on a second piece of the provided ductwork. The method can also include engaging the push-lock male transverse lock on the male end of the first piece of provided circular ductwork with the corresponding push-lock female transverse positioning lock on the female end of the second piece of provided circular ductwork thereby connecting two pieces of circular ductwork so that the two pieces of circular ductwork do not slide apart and become disconnected without disengagement of the push-lock male transverse positioning lock on the male end of the first piece of provided circular ductwork from the push-lock female transverse positioning lock on the female end of the second piece of provided circular ductwork.

The push-lock female transverse positioning lock can include a fastener starter that serves as a guide for a fastener. The push-lock female transverse positioning lock can be a dimple that acts as both the female push-lock mechanism and the guide and can include multiple dimples that can be spaced less than eight inches apart around the female end. A fastener can be inserted into a dimple. The push-lock male transverse positioning lock can be a bead created that corresponds to the dimple.

The male end can have a stop bead that prevents the male end from telescoping within the corresponding female end of another piece of circular ductwork when the two pieces of circular are connected.

This invention also provides for a method for manufacturing HVAC circular ductwork including providing a coil of sheet metal having a female side that will be formed into a female end of the ductwork and a male side that will be formed into a male end; forming a push-lock female transverse positioning lock on the female side of the sheet metal; forming a longitudinal locking mechanism; cutting the sheet metal to proper length for ductwork; forming a female end; forming a male end; forming a push-lock male transverse positioning lock on the female side of the sheet metal and forming the sheet metal into a circular duct form. The push-lock female transverse positioning lock can be a dimple. The dimple is formed on sheet metal after it comes off the roll but prior to the sheet metal being cut.

This invention also provides for a circular sheet metal duct having sheet metal formed into the shape of the duct having a female end, a male end, and a longitudinal snap locking mechanism; locks formed into the longitudinal snap locking mechanism, the locks having a frequency of greater than two inches; and a notch in the longitudinal snap locking mechanism on the female end. The HVAC circular sheet metal duct can include a push-lock female transverse positioning lock; a push-lock male transverse positioning lock; and a gasket on the female end that seals the connections of the duct. The push-lock female transverse positioning lock can be a dimple.

DETAILED DESCRIPTION OF A PREFERRED EMBODIMENT

Definitions

"round metal heating ventilation and air conditioning duct for residential or commercial use"—a cylindrical tube used to transport air—this includes spiral, round and oval ducts.

"forming a male crimped end and a female"—creating two ends used to connect ductwork together in the sheet metal.

"forming a longitudinal latching system on the sheet metal duct"—creating a mechanism in the sheet metal to connect ends of the duct so that it creates a round metal duct.

"gasket"—any type of sealing material that reduces air leakage between the joints formed in the ductwork. This would include a preformed product that has a tape on it and can be applied to the duct. Loctite nuva sil 5039 is an example of cured gasket material.

"cured"—process by which gasket hardens or toughens or turns into a gasket. Can be cross linking of polymer chains.

"first state"—any pre-cured state. Could be a liquid or other state of polymer or other material prior to reaching its final hardened or cured state as a gasket.

"adheres to the sheet metal"—attaching to the sheet metal.

"minimal surface tack"—when ducts are shipped they are nested against other ducts. The surface tack would be such that the ducts would not stick together and/or would not damage the gasket. This could be accomplished by putting a tape material on one side of the gasket. A gasket with a tape would be a gasket with minimal surface tack. Also an uncovered gasket that does not stick to other ducts would be a gasket with minimal surface tack.

"Ultraviolet"—(UV) light is electromagnetic radiation with a wavelength shorter than that of visible light, but longer than soft X-rays. It is so named because the spectrum consists of electromagnetic waves with frequencies higher than those that humans identify as the color violet.

"foamed"—injecting some gas or blowing agent causing the gasket to grow creating bubbles in gasket causing the gasket to be more compressible. A gasketing material that has gas bubbles. A Nordson foam mixer could be used to foam the gasketing material. It is desirable to foam the gasket because less gasket material can be used. If it is foamed at 50% then 50% less gasket material is used.

"sealed joint"—a ductwork joint that has less leakage than a ductwork joint without a gasket.

"ductwork"—includes other straight pieces of duct and all types of fittings.

"round metal duct"—a cylindrical tube used to transport air.

"male end"—designed with a projecting part for fitting into a corresponding female part.

"female end"—designed to be hollow or have a groove into which a corresponding male part fits.

"a bead"—an impression formed into sheet metal.

"a longitudinal snap locking mechanism"—something that allows two ends of duct to be joined together without a separate fastener. Examples of this are a button lock and a reeves lock.

"sheet metal duct"—any type of duct work.

"applying an agent"—using an agent as to aid in the curing. It could be ultraviolet light, radiation, moisture, catalyst or light or anything to help in the curing.

"a female transverse positioning lock"—portion of transverse positioning lock on the female end.

"a male transverse positioning lock"—portion of a transverse positioning lock on the male end.

"transverse positioning lock"—any type of mechanical structure that allows two pieces of ductwork to be rigidly joined together or locked together.

"push-lock"—an integral mechanical coupling on the ends of ductwork that allows the ducts to be pushed together by force and locking the ducts together.

"lock"—a button lock or a reeves lock.

2—circular duct
4—crimped end or male end
6—male bead
8—female end
10—gasket
12—leading edge
14—female bead
16—inside of female bead
18—flared portion
20—lock
22—second bead or push-lock male transverse positioning lock
24—cut out or notch 26—push-lock female transverse positioning lock
28—dimples
30—fastener or a screw

Description

Figure 1:
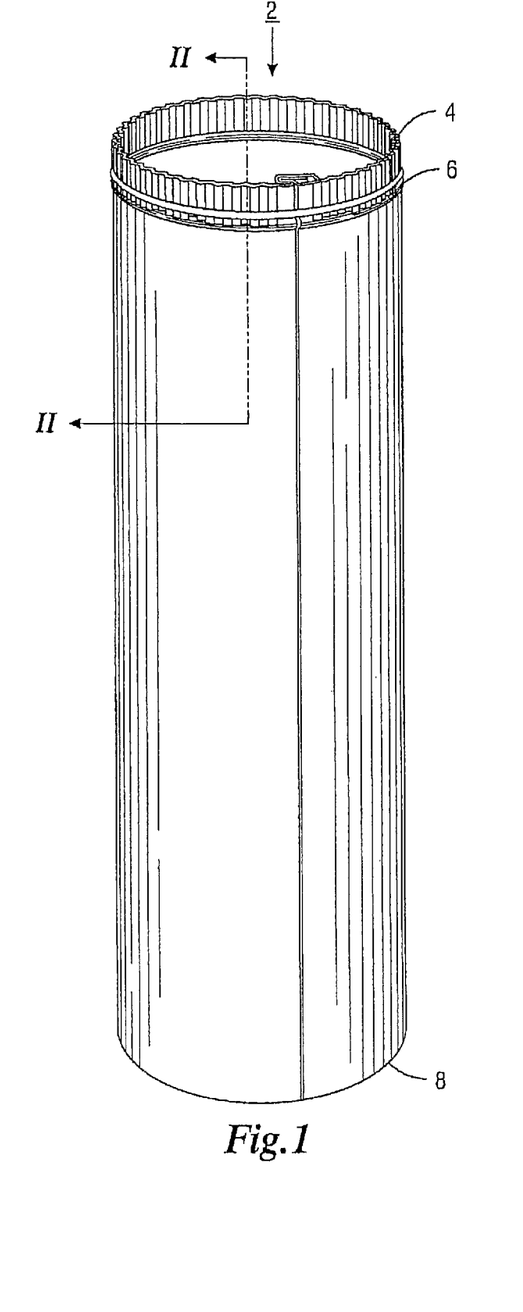
FIG. 1 is an isometric view of a single section of round ductwork showing a male end of a section of round ductwork.

FIG. 1 shows a circular duct 2. Male crimped end 4 has a male bead 6. The male crimped end 4 is designed to be inserted into female end 8 of another duct.

Figure 2:
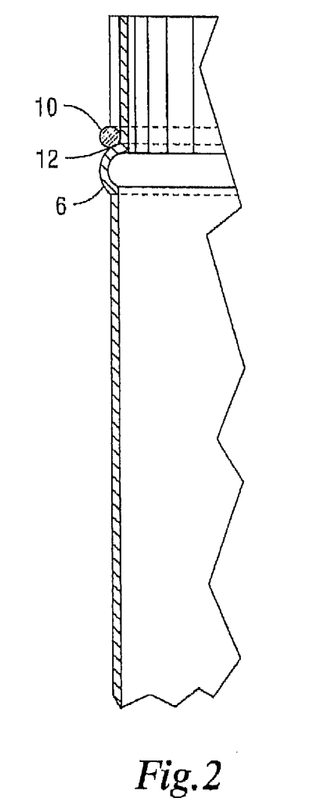
FIG. 2 is a section view of a male end of the ductwork along section II-II.

FIG. 2 shows section II-II of FIG. 1. Fast curing gasket 10 is on a leading edge 12 of the male bead 6. The fast curing gasket 10 is proximate to the male end 4.

Figure 3:
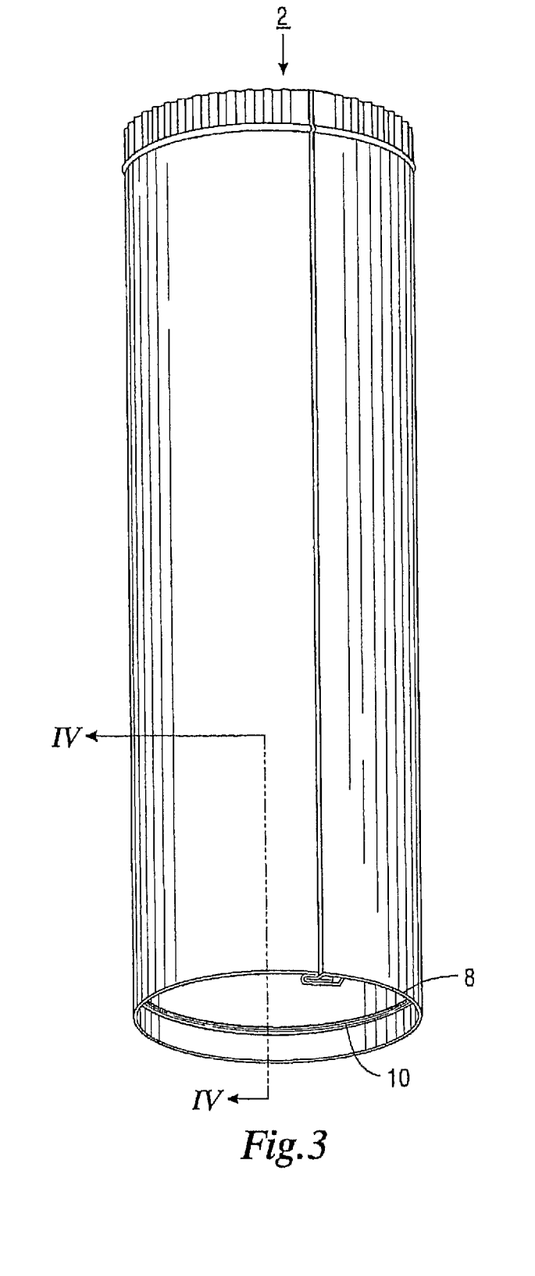
FIG. 3 is an isometric view of a single section of round ductwork showing a female end of a section of round ductwork.

FIG. 3 shows a second embodiment of a circular duct 2. The fast curing gasket 10 is proximate to the female end 8.

Figure 4:
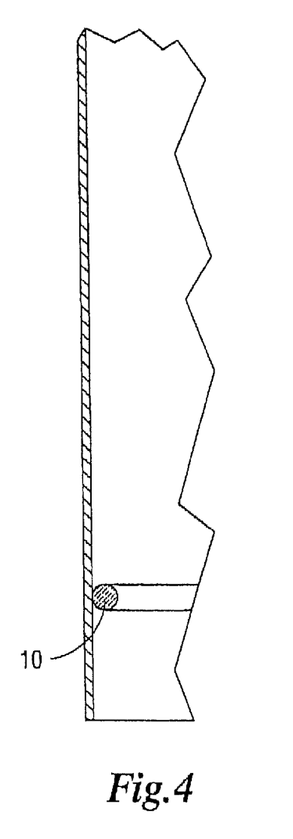
FIG. 4 is a section view of a female end of the ductwork along section IV-IV.

FIG. 3 shows section IV-IV of FIG. 3. Fast curing gasket 10 is proximate to female end 8.

Figure 5:
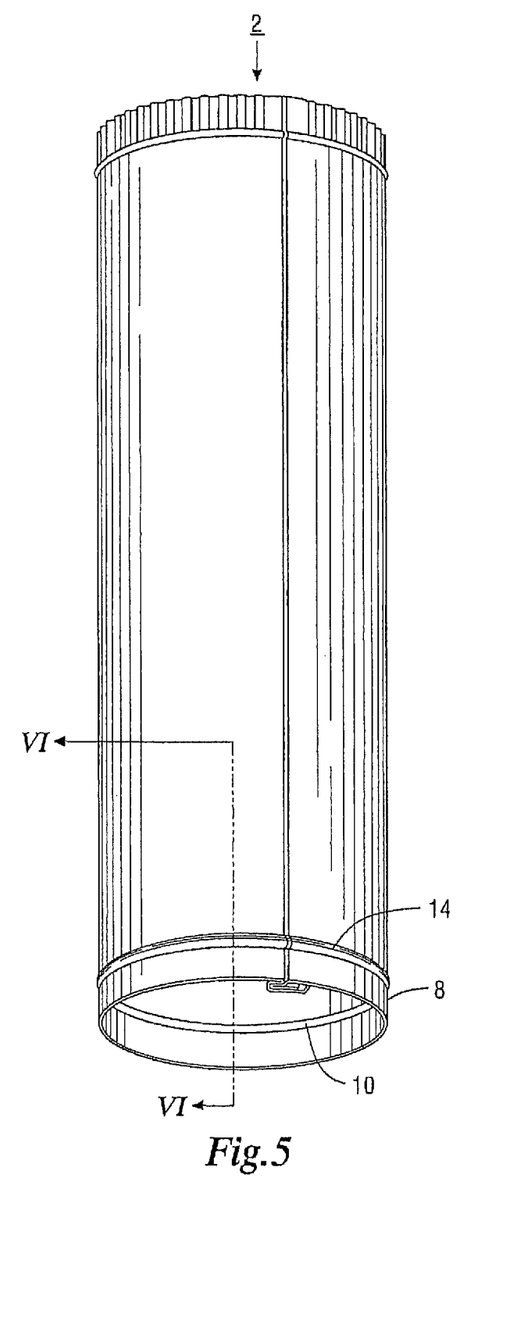
FIG. 5 is an isometric view of a single section of round ductwork showing a female end of the ductwork having a bead.

FIG. 5 shows a third embodiment of a circular duct 2. The female end 8 has a female bead 14.

Figure 6:
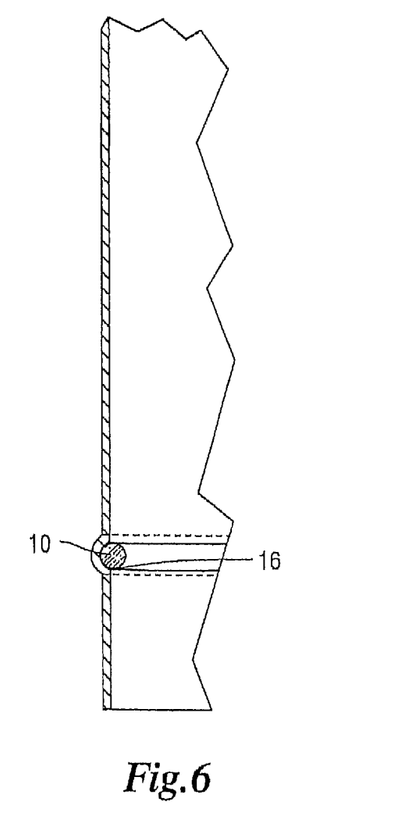
FIG. 6 is a section view of a female end of the ductwork having a bead along section VI-VI.

FIG. 6 shows section VI-VI of FIG. 5. Fast curing gasket 10 is located on an inside of the female bead 16.

Figure 7:
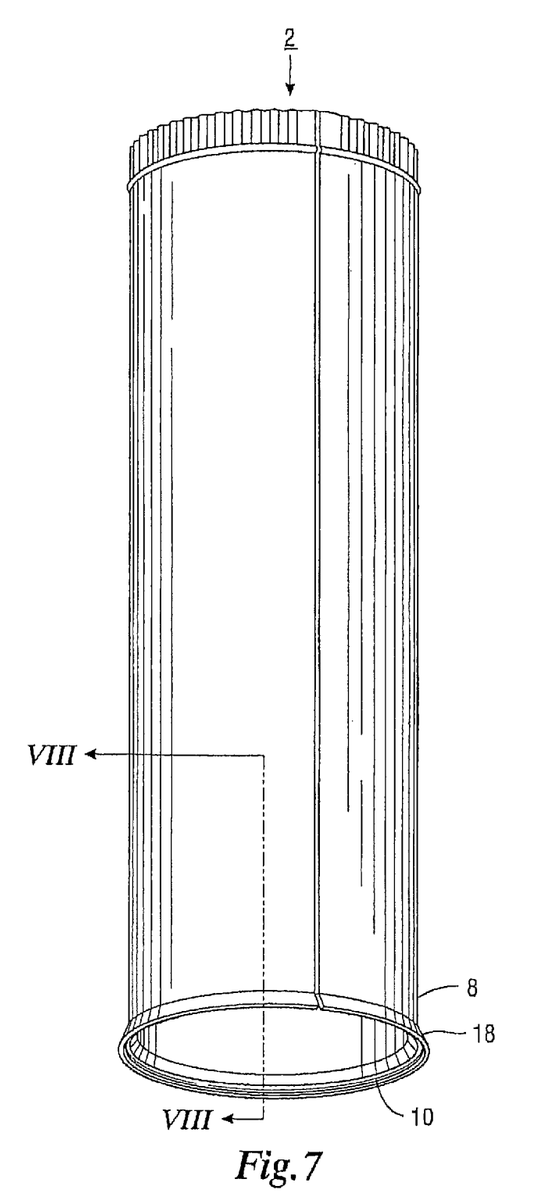
FIG. 7 is an isometric view of a single section of a ductwork having a flared female end.

FIG. 7 shows a fourth embodiment of a circular duct 2. Female end 8 has a flared portion 18.

Figure 8:
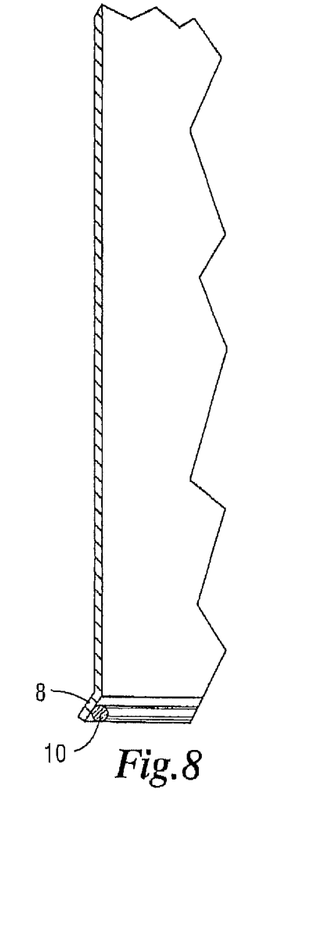
FIG. 8 is a section view of a female end of the ductwork having a flared female end along section VIII-VIII.

FIG. 8 is a cross section along VIII-VIII of FIG. 7. Fast curing gasket 10 is located in the flair portion 18. When a male crimped end 4 is inserted into the female end 8, the male crimped end 4 is able to enter without touching the gasket 10 and the gasket 10 seals on a non crimped part of the crimped male end 4.

Figure 9:
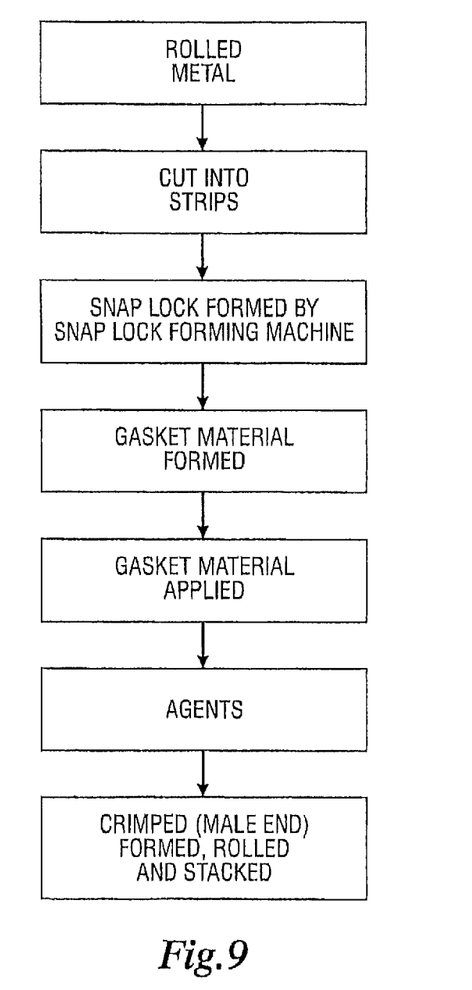
FIG. 9 is a block diagram of the method for forming ductwork.

FIG. 9 is a block diagram of the method of making the circular duct. Sheet metal is cut off of a master coil and travels down a conveyor. The sheet travels into a machine where it may or may not get clipped. The optional female bead can be put in the female portion or the flared portion could be created. Optionally at the same time the gasket may be put onto the sheet at that time. Paper or some sort of covering agent might be placed onto the gasket so that it doesn't stick to adjacent pieces of ducts during shipping thereby making it have little surface tack. By doing it this way it gives the fast curing gasket time to cure and if release paper is used it is a nice flat non stick surface at this point. The gasket may travel under ultraviolet lights to cure. Additionally other agents may be used to increase curing time or aid in curing of the gasket.

The sheet will then travel down the conveyor to the roll forming machines where the longitudinal snap locking mechanism is formed and optionally sealant is applied. This can be seen in application Ser. No. 11/739,238, now U.S. Pat. No. 7,478,467, issued Jan. 20, 2009, which is hereby incorporated by reference in its entirety.

After the longitudinal snap locking mechanism is formed the male portion is formed by crimping an end of the sheet metal. At this same time the male bead is put on.

At this time applicants believe that the preferred embodiment would add the gasket after the longitudinal snap locking mechanism but prior to the male portion being formed. The gasket material is Q'so Q63-40 and preferably is foamed when used in this application. It is foamed by a Nordson Foam Melt 200. The foaming helps with the compressibility of the gasket. The compressibility could be determined in a manner of hardness. The hardness could be measured by a durometer and have a hardness less than Shore A 75. Preferably it would have hardness of Shore OO in the range of 30-50.

A section on the end of the sheet metal may be notched out so that the longitudinal snap locking mechanism stops short of the bead so that it is not crushed when the longitudinal snap locking mechanism is formed. The notched out part helps to form a better seal because the male portion can fit better into the female portion.

The male and female sections can be put together and a sealed connection is created without having to take any further steps. When discussing a sealed connection it is meant to refer where minimal air leakage is present or less leakage than when there is no sealant in the connection.

Figure 10:
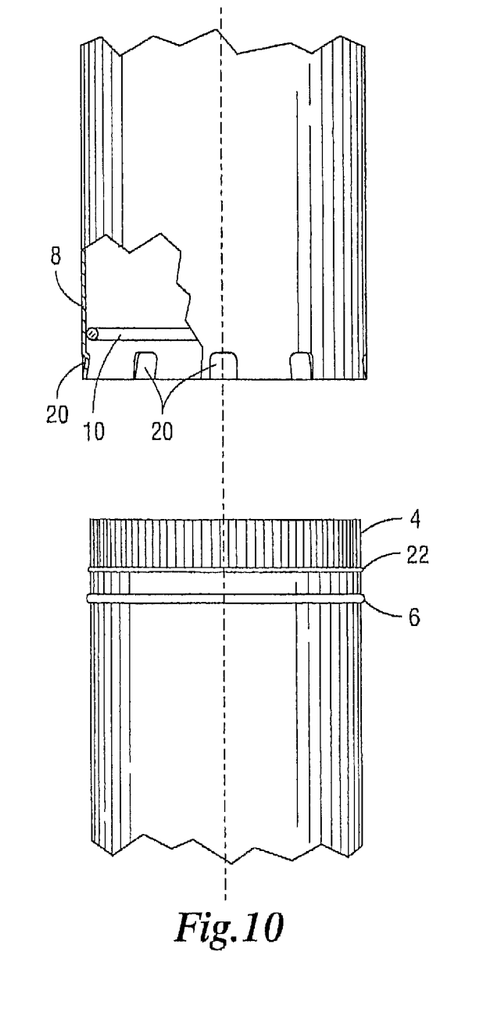
FIG. 10 shows a first embodiment of a female transverse positioning lock and a male transverse positioning lock.

FIG. 10 shows a first embodiment of a transverse positioning lock. On the female end 8 of a duct there can be a lock 20 which in this embodiment is the female transverse positioning lock. The gasket 10 is on an inside of the female end 8 of the duct. The crimped male end 4 has a second bead 22 which in this embodiment is the male transverse positioning lock. The crimped male end 4 fits into the female end so that the second bead 22 slides over the lock 20 and locks the pipes together and ensures that the gasket lines up correctly.

Figure 11:
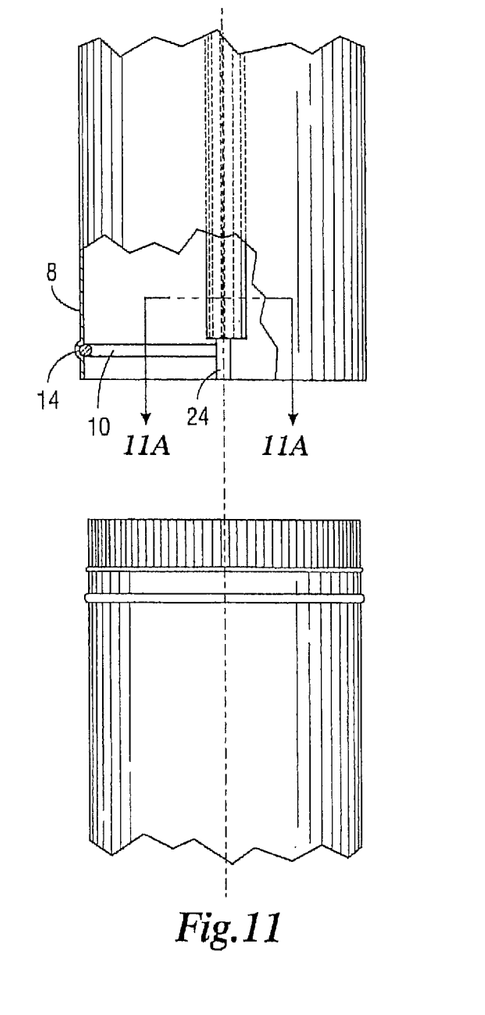
FIG. 11 shows a second embodiment of a female transverse positioning lock and a male transverse positioning lock.
Figure 11A:
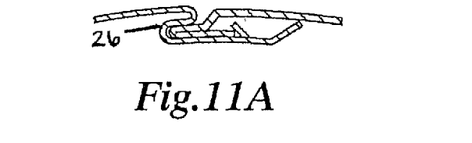
FIG. 11A is a section view of a longitudinal snap locking mechanism.
Figure 14:
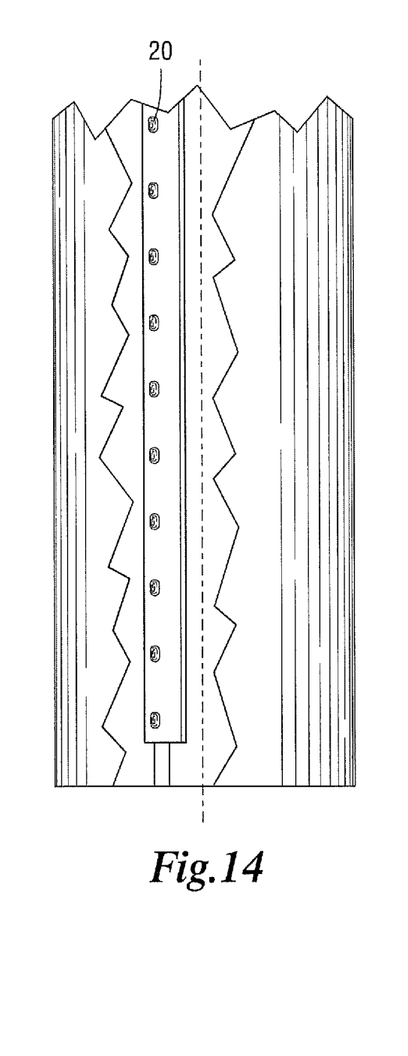
FIG. 14 is a section view of a longitudinal snap locking mechanism having locks.

FIG. 11 shows a second embodiment of a transverse positioning lock. The female end 8 of the duct has a female bead 14. The female end 8 has a cut out 24 or notch (either term can be used hereinafter) on the longitudinal seam. The combination of the female bead 14 and the cut out 24 in this embodiment is the female transverse positioning lock. The longitudinal snap locking mechanism can be seen in FIG. 11A. A female part 26 of the longitudinal snap locking mechanism is removed up until the female bead 14 to create the cut out 24. The crimped male end 4 has a second bead 22 which in this embodiment is the male transverse positioning lock. The crimped male end 4 fits into the female end 8 so that the second bead 22 slides into the female bead 14 and locks the pipes together and ensures that the gasket lines up correctly and creates a proper seal. The cut out 24 allows the female end of the pipe to more closely match the male end of the pipe and allows for a tighter fit. The cut out 24 makes the I.D. of the female end of the pipe more round. The cut out 24 improves the gap between the male and female ends whether or not sealant is used on the ends. If the cut out 24 was not there, the longitudinal snap locking mechanism by sticking out would create a gap between the male and female ends. If sealant is used with the cut out 24, less gasket material is required because the gap between the male and female ends is thinner with the cut out 24. FIG. 14 is a sectional view of a longitudinal snap locking mechanism having locks 20. The preferred embodiment has a lock frequency of every 0.95 inches on a 5 foot pipe, which would equal approximately 60 locks.

Figure 12:
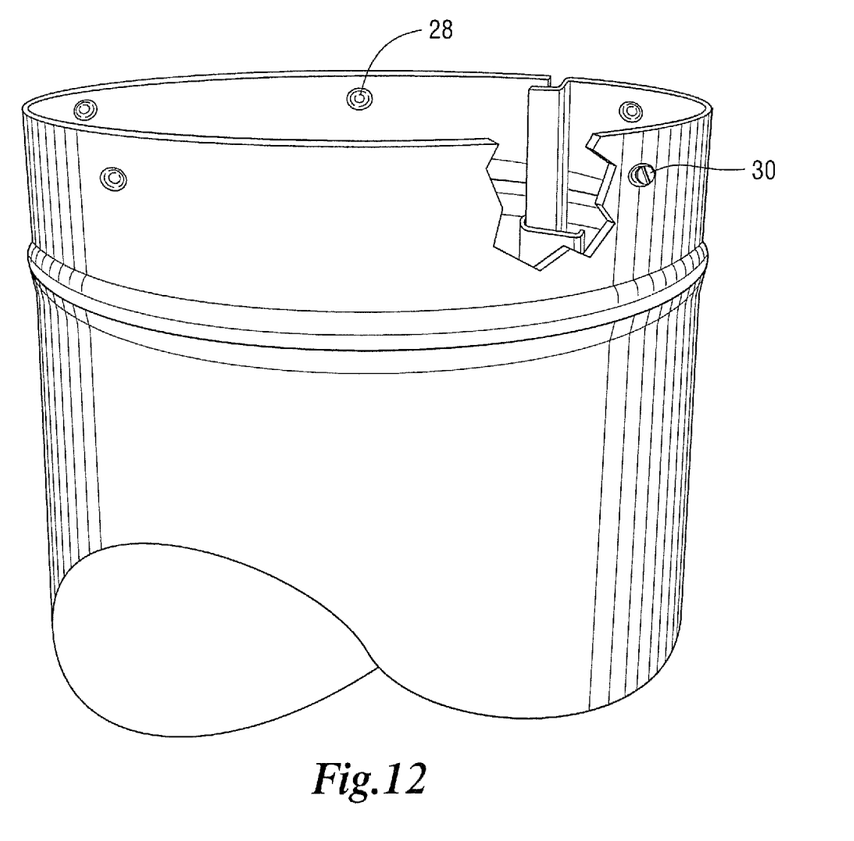
FIG. 12 shows a third embodiment of a push-lock female transverse positioning lock.
Figure 13:
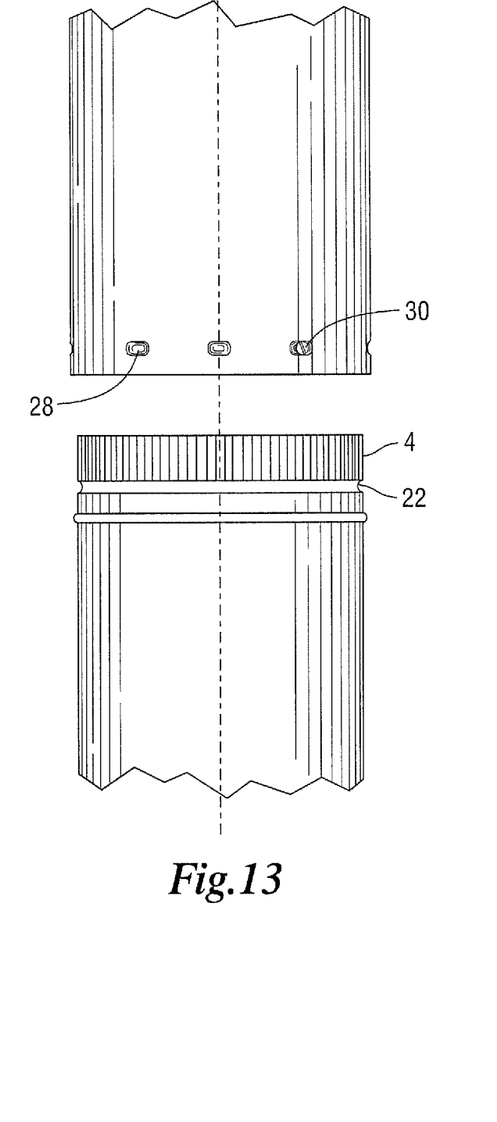
FIG. 13 is a third embodiment of a push-lock female transverse positioning lock and a push-lock male transverse positioning lock.

FIG. 12 shows a third embodiment of a push-lock female transverse positioning lock. FIG. 13 is a third embodiment of a push-lock female transverse positioning lock and a push-lock male transverse positioning lock. Dimples 28 show a push-lock female transverse positioning lock on the female end of the HVAC circular ductwork 2. The dimples 28 engage with a second bead 22 which is a push-lock male transverse positioning lock on the male end of the HVAC circular ductwork 2 in this embodiment. The second bead 22 could be concave or convex with respect to the outer surface of the circular ductwork 2. The combination of the dimples 28 and the second bead 22 create the push-lock transverse positioning lock. This embodiment provides a balance of installation force with the locking force. Typical installations can involve working three stories up on a ladder or boom. This makes handling pieces of ductwork difficult. The installer has to be careful and has great concern so that they do not fall off of the ladder or boom and additionally does not want to push or pull the other ductwork that is already connected apart. The dimples could be compared with a leaf spring or series of leaf springs or the button locks which required more installation or insertion force. Additionally with the leaf spring scenario, if the crimped end 4 was not perfect it could cause the leaf spring to deform upon insertion and thereby not create good locking force. The dimples 28 do not give and therefore are forced over the second bead 22 and then can maintain a good juncture even if the crimped end 4 is not perfect. The dimples 28 give the right balance of retention force combined with insertion force. The level of insertion force with the dimples 28 would be acceptable to installers.

The process of creating the preferred embodiment starts with a coil of sheet steel. The coil is either 5 or 2 feet wide. As the metal is dispensed off the coil, the first step is to add the bead for the sealant and the dimple. Those two features are added as the metal is pulled between two sets of rolls. The sealant bead is created as the metal is pulled between two rolls. One roll has a rib around the circumference and the other roll has a corresponding female depression around its circumference. As the metal is pulled between those rolls, the male rib and the female depression form the bead. Next to the rolls that create that sealant bead, there is a similar set of rolls that creates the dimple. In this case, the rolls are inverted so that the dimple will pop out in the opposite direction of the sealant bead. Instead of the roll having a continuous rib around the circumference, there are periodic bumps or projections. On the female roll there is still a continuous depression around its circumference, which is how the dimple is created.

The dimples 28 are spaced with a frequency of less than 8 inches. The preferred embodiment has the dimple frequency 2-4 inches. The current best known frequency is 4 inches. The frequency could be less than 8 inches, less than 4 inches, or 2-4 inches. A fastener or screw 30 can then be inserted into the dimple.

Circular ductwork installation guidelines provided by Sheet Metal and Air Conditioning Contractors' National Association ("SMACNA") and other guidelines require the use of a screw 30 at the joint of two pieces of ductwork. Again it is often difficult for installers while working in elevation to start a screw into the sheet metal. The dimples 28 serve a dual purpose of not only the female transverse positioning lock but also as guide for a screw 30. This is a big help to installers.

The transverse positioning lock can also help installers when they are putting up ductwork as it can enable them to measure and or install the ductwork without drooping or sagging of the pieces without using a screw. The installer can put up the ductwork system and measure and cut pieces without having to fasten all the pieces together with a screw. This gives great flexibility and ease in the installation process. The transverse positioning lock is part of the ductwork and integrally formed into the sheet metal of the HVAC circular ductwork 2. It is not a separate connector. Additionally, the push-luck is not a threaded screw connection.

Figure 15:
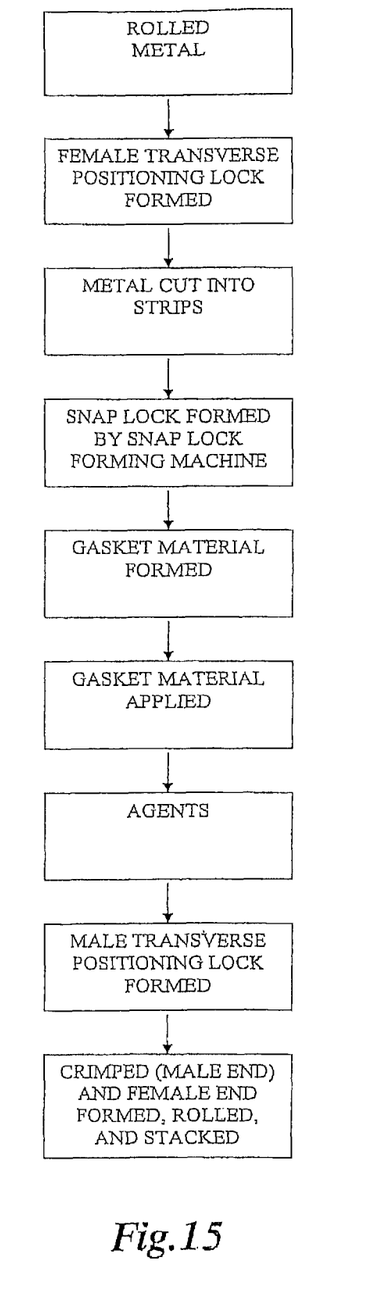
FIG. 15 is a block diagram of the method of manufacturing the circular ductwork.

FIG. 15 is a block diagram of the method of manufacturing the ductwork. Sheet metal comes off of the roller from a coil of sheet metal. A female transverse positioning lock is formed on the female end of the sheet metal. A dimple can be formed by a roller on a Slear machine (such as one produced by Iowa Precision Industries, Inc. under the registered trademark SLEAR), which is a combination of a "slitter" and a "shear," after it comes off of the roller but prior to being cut. The metal is then cut into proper length strips. The metal goes through a roll former that puts the longitudinal seam on it. The end seam gasket is applied. A male transverse positioning lock is formed, the crimp is applied, and the sheet metal is formed into circular ductwork given a curvature on the pipe roller.

Figure 16:
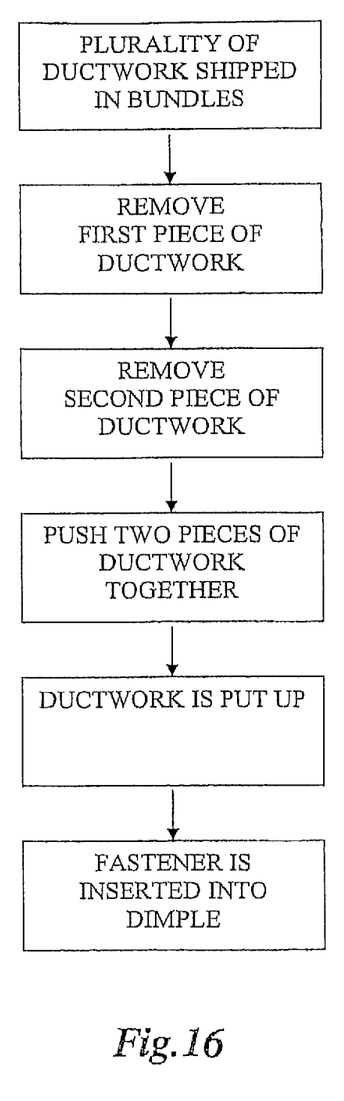
FIG. 16 is a block diagram of the method of installing the circular ductwork.

FIG. 16 is a block diagram of the method of installing the ductwork. The ductwork is shipped in bundles of approximately ten pieces. To install the ductwork, the installer will take off a first piece of ductwork, then the installer will take off a second piece. The installer will engage the longitudinal snap locking mechanism to create circular ducts. The installer will then push the two pieces of ductwork together, making sure that the second piece slides over the dimple on the first piece and it locks in. The installer will then put the ductwork up. The next step is putting a fastener in the ductwork.

Various changes could be made in the above construction and method without departing from the scope of the invention as defined in the claims below. It is intended that all matter contained in the paragraphs above, as shown in the accompanying drawings, shall be interpreted as illustrative and not as a limitation.

We claim:

1. A circular sheet metal duct comprising:
   (a) sheet metal formed into the shape of the circular duct having a female end, a male end, and a longitudinal snap locking mechanism to join the ends of the sheet metal to form the circular duct;
   (b) locks formed into the longitudinal snap locking mechanism, the locks having a frequency of greater than two inches; and
   (c) a notch formed at the female end of the circular duct by eliminating a portion of the longitudinal snap locking mechanism extending from the female end inwardly to a depth that the male end enters the female end.

2. A circular sheet metal duct as recited in claim 1 including:
   (a) a push-lock female transverse positioning lock; and
   (b) a push-lock male transverse positioning lock.

3. A circular sheet metal duct as recited in claim 2 including a gasket on the female end that seals the connections of the duct.

4. A circular sheet metal duct as recited in claim 3 wherein the push-lock female transverse positioning lock is a dimple.

* * * * *